United States Patent [19]

Murtha et al.

[11] 3,812,470

[45] May 21, 1974

[54] PROGRAMMABLE DIGITAL SIGNAL PROCESSOR

[75] Inventors: John C. Murtha, Baltimore; James A. Ross, Jr., Aberdeen, both of Md.

[73] Assignee: Westinghouse Electric Corporation, Pittsburgh, Pa.

[22] Filed: July 31, 1972

[21] Appl. No.: 276,639

[52] U.S. Cl. .............................. 340/172.5, 235/164

[51] Int. Cl. ......................... G06f 9/00, G06f 11/00

[58] Field of Search ....... 340/172.5; 235/164; 343/5

[56] References Cited

UNITED STATES PATENTS

| | | | |
|---|---|---|---|
| 3,648,253 | 3/1972 | Mullery et al. | 340/172.5 |
| 3,351,937 | 11/1967 | Spens | 343/5 |
| 3,700,874 | 10/1972 | Heightley | 235/164 |
| 3,551,892 | 12/1970 | Driscoll, Jr. | 340/172.5 |

OTHER PUBLICATIONS

Leeds and Weinberg, Computer Programming Fundamentals, McGraw-Hill, 1970, p. 29. QA76.5. L42.

*Primary Examiner*—Raulfe B. Zache
*Attorney, Agent, or Firm*—F. B. Hinson

[57] ABSTRACT

A programmable digital signal processor using microprogrammed macro instructions to perform complex arithmetic instructions and other complex data processing instructions is disclosed. A plurality of address counters and memory modules are included to permit the generation of address sequences which simplify the implementation of complex macro instructions. A number representation scheme is used which simplifies the handling of overflows which occur during certain types of statistical problems. A typical example of a macro instruction utilizing these features is a Fast Fourier Transform.

11 Claims, 16 Drawing Figures

PATENTED MAY 21 1974

3,812,470

SHEET 10 OF 12

PROGRAMMABLE DIGITAL SIGNAL PROCESSOR

BACKGROUND OF THE INVENTION

Field of the Invention

The invention relates to digital systems and more specifically to digital processors for efficiently performing complex arithmetic computations such as a Fast Fourier Transform.

SUMMARY OF THE INVENTION

A digital processor specifically designed to permit complex arithmetic functions to be easily implemented is disclosed. The processor executes macro instructions which are interpreted by a micro program. The micro program is most conveniently determined at the time the processor is manufactured and stored in a read only memory. Changing the micro program permits the processor to be reconfigured to either add new instructions or to delete or modify existing instructions.

The processor also includes a plurality of memories modules in which data can be stored from an external source, transferred out of to other systems by the processor, serve as a data storage source for arithmetic instructions, or be used to store the results of arithmetic operations. Each of the memories includes completely separate address and control logic thereby permitting the memories to operate essentially independent of each other. For example, in an arithmetic operation data to be used by the instruction can be read from one memory and the results stored in a second memory thereby permitting the arithmetic operations to proceed at the basic memory rate.

A plurality of address counters are also included in the processor to permit address sequences which are especially suitable for use in complex operations to be generated. Included in these address counters are provisions permitting address sequences beginning and ending at a predetermined address to be generated. Additionally, reverse bit counters and bit twist counters are included for generating address sequences which are especially useful in Fast Fourier Transforms to be generated. Address sequences generated by systems external to the processor can also be used. This provision is particularly useful in generating frequency spectrum shifts and other similar types of arithmetic processing.

Provisions are also included which permit the counters to be used to generate groups of addresses beginning and ending with specific values. The counter increment may also be selected permitting certain addresses to be skipped.

The digital processor is particularly useful when used in conjunction with a second general purpose digital computer or similar system for providing data, programs and controlling the processor. As an aid in such a configuration, a counter is included which automatically counts the number of arithmetic operations which generate an overflow. An overflow results when an arithmetic operation generates a magnitude which exceeds the maximum magnitude which can be represented by the processor word. The number of counts accumulated by this counter can be read by the system controlling the processor and the data supplied to the processor can be rescaled to permit the cumulative count to be maintained at an acceptable value. This feature is particularly useful when certain types of statistical data processing is being performed because a certain number of overflows can be tolerated without causing an unacceptable error in the final calculated result. The subsequently discussed system for representing numbers also reduces the error which is introduced into the final answer by each overflow.

The processor operates using 2's-complement arithmetic and a self-saturating number system. The 2's complement arithmetic is conventional and is used by most digital computers. This number system has the advantage that addition and subtraction can be performed by the same hardware by a simple change in the representation of positive and negative numbers. Using this system, the negative representation of a number is generated by inverting each bit of the positive number and adding one. (binary addition) For example, if the positive number is represented by 1001. The negative value will be 1011. This system also permits the most significant bit of the digital word to be used as a sign bit without requiring special provisions for assuring that the sign bit has a proper value. For example, it is well known that in this system the sign bit can be treated as another data bit of the digital word and processed through the adders comprising the arithmetic unit and the proper sign will always result in the absence of an overflow. The method of handling overflows is related to the saturable number representation, used in the processor and will be described in detail later. However, this number system has the characteristic that if two positive numbers are added and these numbers have a magnitude such that the result has a magnitude larger than that which can be represented by the digital data processor word, the result generated will appear to be a negative number because the sign bit will be changed by the resulting overflow. The magnitude of this number depends on the magnitude of the numbers added, however, in the worst case it can have a magnitude equal to the maximum negative magnitude which can be represented by the digital data processor word. Correspondingly, the addition of two negative numbers can result in an apparently positive number having an error similar to those discussed above.

The above characteristic can introduce unacceptable errors when it is desired to ignore a substantial number of overflows in statistical data processing problems. This problem is substantially reduced in the disclosed processor by the use of a self-saturating number system. In this system, when an overflow is generated, the sign is retained and the magnitude set to the largest magnitude which can be represented by the digital data word. Using this representation, it is convenient to restrict the negative values to the same magnitude as the positive values although it is well known that in this type of arithmetic representation the maximum negative number which can be represented is larger than the maximum positive number. Although this representation applies primarily to the results of arithmetic operations, it may be convenient to similarly restrict data values to prevent overflows from occurring during multiplies. This system of representing numbers substantially decreases the errors which can be introduced by each individual overflow because the maximum error which can be introduced is the value of the overflow.

A plurality of the above-described data processors can be connected in a pipe line configuration in order to solve problems which exceed the computing capability of an individual processor. In this configuration all the processors are not required to be identical. In fact, selected ones of the processors might be general purpose digital computers.

DETAILED DESCRIPTION

Figure 1:
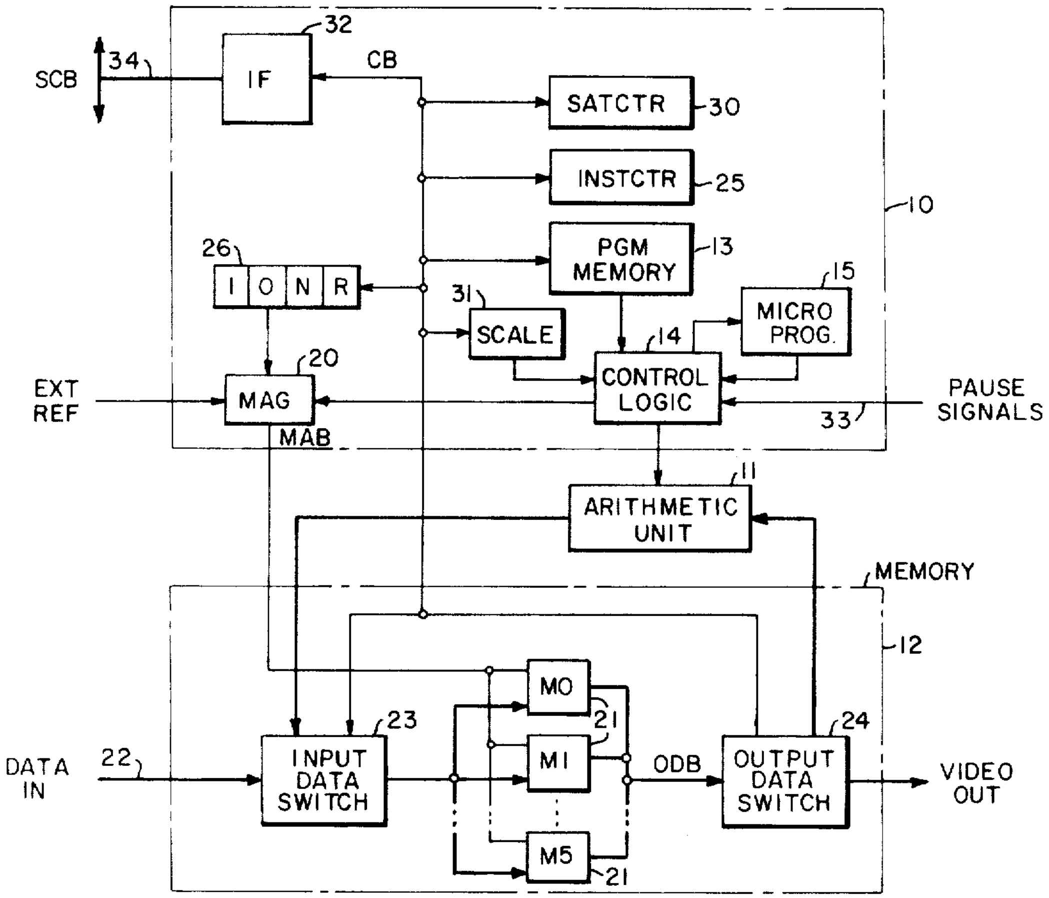
FIG. 1 is a functional block diagram of the digital processor.

FIG. 1 is a functional block diagram of the digital processor. The processor comprises a control section, an arithmetic section and a memory section, respectively illustrated at reference numerals 10, 11 and 12. The memory section 12 provides means for storing data to be used in data processing operations and for storing the results of answers generated therefrom. The arithmetic section 12 contains all the logic necessary to perform complex arithmetic computations and other data processing functions. The arithmetic unit includes four multipliers and six adders. These are combined through multiplexers and other logic, not shown in this drawing, to perform a plurality of complex arithmetic data processing operations which will be described in more detail later.

The control section 10 generates all the control signals necessary to control the arithmetic and memory units 11 and 12 in response to macro program instruction words which are stored in a program memory 13.

The macro program instruction words which are stored in the program memory 13 are read by control logic 14. Micro program instruction words stored in a micro program memory 15 are also read by control logic 14. The macro program instruction words are interpreted by the micro program instruction words thereby causing the control logic 14 to generate the necessary signals to control the arithmetic unit 11 and the memory address generator 20 to generate the proper control and address signals for the arithmetic unit 11 and the memory unit 12.

The memory unit 12 contains six memory modules labeled MO through M5 with only three of these modules being illustrated. (More or less than six memory modules 21 may be used depending on the detailed design of the processor.) Data is selectively coupled to the input of the memory modules 21 from the arithmetic unit 11 and from an external data input 22 by an input data switch 23. The output of the memory modules 21 is selectively coupled by an output data switch 24 to the arithmetic unit 11 and to the input data switch 23. The input and output data switches 23 and 24 are controlled by the micro program instruction words as required by the macro instruction being executed.

The macro program instruction words are stored in the program memory 13 as previously described. An instruction counter 25 specifies the addresses from which the macro instructions are to be read.

A series of address modification or index registers are collectively shown at reference numerals 26 and are labeled I, N, O and R. 16 values for each of these registers are stored in a memory (not shown). These values are read and the registers set to the value specified by the macro program instruction words. The functions of these registers will be described in more detail later.

As previously explained, the digital processor utilizes a self-saturating number representation in which any arithmetic operation which generates an overflow will automatically set the output to a value having the proper sign and a magnitude equal to the maximum value which can be represented by the digital data word. A counter is incremented to indicate how many times this has occurred. The counter counting these overflows is called the saturation counter and is illustrated at reference numeral 30.

The rate at which overflows occur is related to the scaling of the data because the processor performs fixed point arithmetic. Means is provided to change the scale of all the data being used by the processor by storing a number in a scale register. The scale register is illustrated functionally at reference numeral 31.

The digital processor may be provided macro instruction words and data by a control system (not shown). Each word from the control system may contain information or data bits along with control bits. This requires that the word be interpreted so that the data can be stored in the proper location or the proper control signals generated. The interpretation of these words is made by an interface section 32.

Through the interface section 32 the master control system has access to the saturation counter 30, the macro instruction counter 25, the macro program memory 13, the memory for storing values for the I, O, N, and R registers and the memory modules 21. Additionally, the control system can supply hold signals to the control logic 14 by way of the hold signal input lines 33. These signals cause the macro program to stop at preassigned points for the duration of these signals.

The digital processor is supplied signals from the control system (not shown) by way of the system control bus 34 and the interface unit 32. At the beginning of each program a series of macro program instructions are stored in program memory 13, the instruction counter 25 is set to its starting value, the saturation counter 30 is set to zero, initial values for the I, O, H and R registers are stored in a memory (not shown) and the scale register 31 is set to its proper value by data transferred by the control system through the interface 32. The program then starts and is fully executed unless it is delayed by hold signals coupled to the hold signal input line 33.

Figure 2:
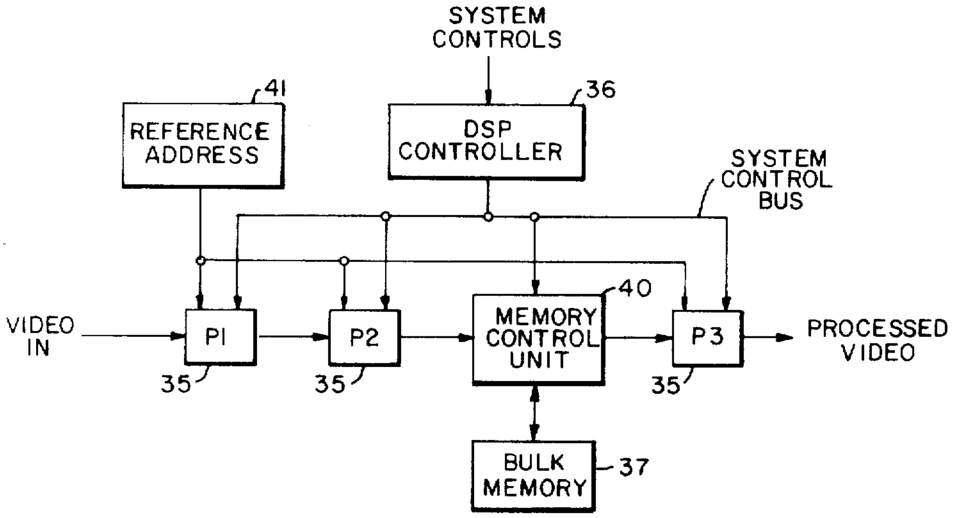
FIG. 2 is a diagram illustrating how a plurality of digital processors can be connected in a pipe-line configuration.

FIG. 2 illustrates how a plurality of digital processors 35 can be serially connected in a pipe-line configuration by a common controller 36. Each stage of the pipe line may include more than one processor. In this configuration each of the processors performs only a small portion of the data processing problem to be solved thereby permitting the through put of the system to be greatly increased. Additional memory is also provided by a bulk memory module 37 with access to this memory controlled by a memory control unit 40. External reference addresses are provided to each of the processors 35 by a reference address generator 41. These addresses may be used in executing instructions. Although only three processors 35 have been shown in this illustration it is obvious that either more or less processors can be used depending on the application.

Figure 3:
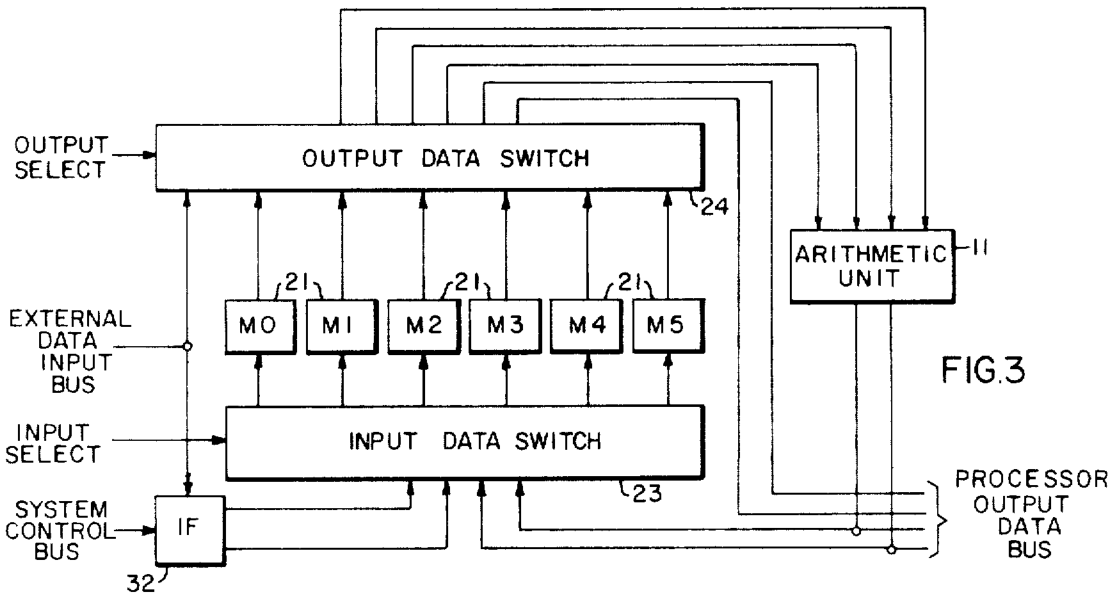
FIG. 3 is a block diagram of the arithmetic and memory units coupled together by memory input and output switches.

FIG. 3 is a more detailed functional block diagram of the memory modules 21 and the input and output data switches 23 and 24. From this diagram it can be seen that data is supplied to each of the memory modules 21 through an input data switch 23. The inputs to the input data switch 23 come from the arithmetic unit 11 and the interface unit 32. Control signals generated by decoding the bits of the micro program select which of the inputs to the input data switch 23 will be selectively coupled to the memory modules 21. Addresses are supplied to each of the memory modules 21 by the memory address generator 20 (MAG) FIG. 1. The addresses are generated by the address generator in response to control signals generated by decoding the micro program instruction words. The data output signals of each of the memory modules 21 are coupled to the output data switch 24. The output signals of the output data switch are coupled to the arithmetic unit 11. There is also two data lines from the output data switch 24 to the processor output data buss. It will be noted that four separate data lines are coupled from the output data switch 24 to the arithmetic unit 11. Each of these data lines transmits both the real and imaginary parts of a complex number to the arithmetic unit 11. The output data switch 24 receives control signals which determine which input data line will be coupled to which data outout line from the control logic 14 (FIG. 1). These signals are generated by decoding the output data bus portions of the micro program instruction word.

The input data switch 23 also receives an input from the interface module 32. It is through the interface module 32 that the system control system supplies programs and data to the processor.

Figure 4:
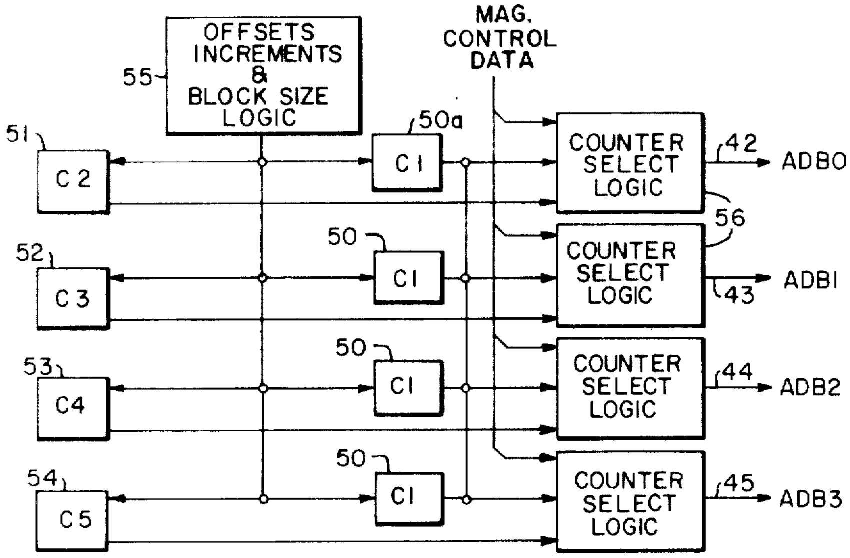
FIG. 4 is a block diagram of the processor memory address generator.

FIG. 4 is a functional block diagram of the memory address generator 20 (FIG. 1). The memory address generator 20 comprises counters C1 through C5 respectively illustrated at reference numerals 50*a* through 50*d* and 51 through 54, counter select logic 56 and the offset, increment and block size logic 55. The function of the memory address generator as illustrated in FIG. 4 is to generate address sequences for the memory modules 21 as required by the execution of the macro program instruction words. These addresses are coupled to memory address buses 42 through 45 by the counter select logic 56 in response to signals generated by the control logic 14 (FIG. 1) in response to decoding of the micro program instruction words.

Counters C1 illustrated in reference numerals 50*a* through 50*d* are binary counters for generating addresses having the proper number of bits as required to address all locations in the random access memory modules 21 (FIG. 1). The normal binary sequence of address generated by this counter may be modified in three respects. Each of these modifications are performed by data words supplied to the processor as part of the normal programs.

Each of these modifications will be treated separately but it should be understood that a particular address sequence may be modified by one, all or any combination of these modifications.

The first and perhaps simplest modification to the address sequence is an offset. An offset is simply a digital data word which specifies the first address to be generated by an address counter. Each of the counters C1 through C5, illustrated at reference numerals 50*a* through 50*d*, may be modified in this manner. For example, if the first address to be generated by address counter C1 illustrated at reference numeral 50*a* is to be 128, an offset number of 128 is stored in a storage memory associated with the C1 counters and this number is read from the memory and gated into this counter at the start of the execution of the instruction utilizing this counter thereby causing the address sequence generated by this counter to begin at this value.

The second modification applicable to counters C1 through C5 is a block size. The block size is simply a number stored in a memory which determines the number of distinct addresses to be generated by the counter. For example, if 100 sequential addresses are to be generated by 50*a* a block size number of 100 will be stored into a memory associated with this counter. This number is added to the offset number and the sum continuously compared to the contents of the counter. When the comparison indicates that the two values are equal, a signal is generated to indicate that the address sequence is complete.

The third modification applicable to counters C1 through C5 is an increment number. This is a digital number which is stored in a memory and which specifies the number of times the counter will be incremented between successive distinct addresses. For example, if the instruction being executed requires address sequences to be generated such that every other sequential address is skipped the increment number will be set to two. Then each time a memory address is generated the address counter will be incremented two binary counts to generate the next address of the sequence. This generates addresses such as zero, two, four, six, eight, ten, etc. Odd sequences of addresses such as 1, 3, 5, 7, 9 and 11 can be generated by setting the offset to 1 and the increment to 2. There are 16 memory locations allocated to storing values for each of the above discussed modifications. The memory location for each modification is selected by the macro instruction. The values to be used in address modifications are stored in these memories by the control system before the execution of a particular program begins.

In situations where large increment values are to be used the speed of operation may be increased by adding the increment number of the contents of the counter being modified using a conventional parallel digital adder.

The memory address generator illustrated in FIG. 4 includes four additional counters illustrated at reference numerals 51 through 54. Each of these counters is adapted to generate special address sequences which are useful is complicated data processing problems.

Counter C2 illustrated at reference numeral 51 is a reverse bit order counter. This counter can best be explained as a simple inversion of the order of the bits of a normal binary counter. For clarity all counts of a three bit binary counter and the reverse bit counterparts are illustrated below.

| Binary Counter | Reverse Bit/Order Counter |
|---|---|
| 000 | 000 |
| 001 | 100 |
| 010 | 010 |
| 011 | 110 |
| 100 | 001 |
| 101 | 101 |
| 110 | 011 |
| 111 | 111 |

Counter C3 illustrated at reference numeral 52 is a bit twist counter. This counter can best be described as an address sequence which is generated by the inversion of the most significant bit of a normal binary counter. For clarity the bits of a normal binary counter and the bit twist counterparts are illustrated below.

| Binary Counter | Bit Twist Counter |
|---|---|
| 000 | 100 |
| 001 | 101 |
| 010 | 110 |
| 011 | 111 |
| 100 | 000 |
| 101 | 001 |
| 110 | 010 |
| 111 | 011 |

The reverse bit and bit twist counters are particularly useful in implementing Fast Fourier Transform macro instructions.

Counter C4 illustrated at reference numeral 53 is not normally a part of the actual processor hardware. It is preferably hardware for generating address sequences which is external to the processor. This feature is particularly useful in generating frequency shifts associated with digital filtering and similar problems.

Counter C5 illustrated at reference numeral 54 can be either the complement, the reverse order counter or the normal order counter.

In all of the above discussed counters are most easily implemented by a normal binary counter whose output is first modified by the increment number, the offset, the block size and then remaining modifications as required. Each of the counters, C1 through C5, may be independently modified in this manner.

Figure 5:
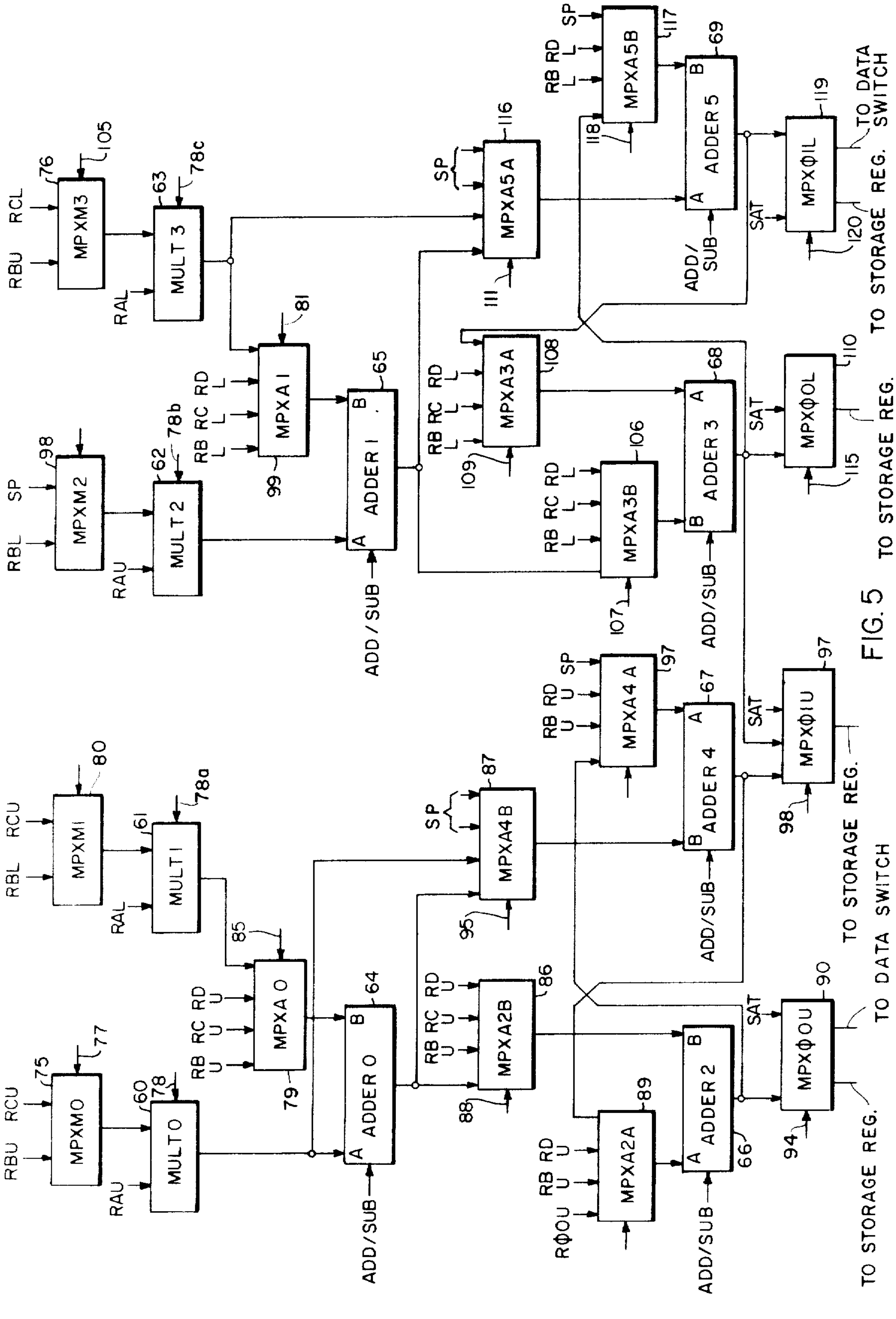
FIG. 5 is a functional block diagram of the arithmetic unit.

FIG. 5 is a functional block diagram of the arithmetic unit 11 (FIG. 1). The arithmetic unit includes four multipliers 60 through 63 and six adders 64 through 69. The inputs to these multipliers and adders are provided by a plurality of multiplexers to permit this unit to perform the arithmetic data processing operations required during the execution of the arithmetic and data processing instructions. The arithmetic section is specifically designed to simplify the performance of the Fast Fourier Transform because this is one of the more complicated computations which the processor will be required to perform. It is well known that each stage of this algorithm requires two complex multiplication and two complex additions to calculate both the real and imaginary coefficients. This capability is provided by the above-discussed multipliers and adders in the arithmetic section 11.

The arithmetic unit 11 also includes four data registers not shown in detail for supplying numbers to the arithmetic unit. The arithmetic unit is designed so that all the bits of a selected register can be treated as a single digital word or they can be treated as two digital words, each word having the same number of bits. These registers have arbitrarily been designated registers *a*, *b*, *c*, and *d*. The data inputs from these registers to the arithmetic unit shown in FIG. 5 are designated by legends which indicate the origin of the data word. For example, one of the inputs to multiplexer MPXMO, illustrated at reference numeral 77, is the upper bits of register *c* and this is designated RCU. Similarly, the lower bits of register *c* form one of the inputs to MPXM3 illustrated at reference numeral 76 and are designated RCL. In each of these designations, R stands for register, the middle letter, *c* in this case, indicates the register from which the number originates, and the last letter in the designation indicates whether it is the lower or the upper bits of this register, with "U" and "L" respectively indicating the upper and lower bits. All the other data inputs to the multiplexers comprising the arithmetic units shown in FIG. 5 use this type of identifying legend.

Referring again to FIG. 5 it can be seen that multiplier zero illustrated at reference numeral 60 is connected such that it can multiply the upper bits of register *a* by either the upper bits of register *c* or the upper bits of register *b*. Whether the upper bits of register *b* or the upper bits of register *c* will be multiplied by the upper bits of register *a* is determined by a logic signal which is coupled to the enable terminal 77 of MPXMO illustrated at reference numeral 75. For one level of signal coupled to the terminal 77 the upper bits of register *b* will be gated to multiplier zero illustrated at reference numeral 60 and for the other value of logic signals the upper bits of register *c* will be coupled to this multiplier. Multiplier zero illustrated at reference numeral 60 also includes a scale input terminal 78. A logic "one" signal coupled to this terminal shifts the data one bit to the right to reduce overflows which may occur as a result of subsequent additions performed by the adders comprising the arithmetic unit. These logic signals are generated by decoding scale numbers stored in the scale register 31, illustrated in FIG. 1.

Multiplier zero illustrated at the reference numeral 60 is identical to multipliers 1, 2 and 3 illustrated at reference numerals 61, 62 and 63. Multipliers MPXM1, MPXM2 and MPXM3 respectively illustrated at reference numerals 80, 98 and 76 are identical with multiplier MPXMO 77 previously discussed. Multipliers 1, 2 and 3 respectively illustrated at reference numerals 61, 62 and 63 also include a provision for accepting a scale input signal via input terminals 78a, 78b and 78c. However, as indicated by the legends, these latter multiplexers receive input data from different sources. Therefore, these latter multipliers will not be described in detail in subsequent text.

Adder zero illustrated at reference numeral 64 has two data inputs. This adder and the other adders illustrated accept an add/sub signal which determines whether the actual arithmetic function performed will be an addition or a subtraction. One of the inputs is the product output of multiplier zero illustrated at reference numeral 60 and the other input is the output signal of multiplexer MPXA 0 illustrated at reference numeral 79. The data inputs to MPXA 0 are the upper bits of registers *b*, *c* and *d* and the product output of the multiplier ONE. Enable signals coupled to the enable input terminal 85 of this multiplexer determines which of the data input signals will be coupled to the output terminal of this multiplexer. It should be understood that although the enable input to this and other multiplexers of this drawing is shown as a single line that in general these will be multibit signals.

The output of adder zero illustrated at reference numeral 64 is coupled to one data input of multiplexers MPXA2B and MPXA4B respectively illustrated at reference numerals 86 and 87. There are three other inputs to multiplexer MPXA2B 86 from the upper bits of registers *b*, *c* and *d*. The output of this multiplexer is coupled to the input of adder TWO illustrated at reference numeral 66. A multibit enable signal is coupled to the input enable terminal 88 of this multiplexer. This signal is in general a multibit signal and determines which of the data inputs is to be coupled to the data output terminal of the multiplexer. The other input to adder TWO 66 is the data output terminal of multiplexer MPXA2A. The inputs to multiplexer MPXA2A are the output of a storage register zero, (this input is designated RφOU). The output of adder four 67 and the upper bits of registers *b* and *c*. The output of adder TWO is coupled to one data input terminals of multiplexer MPXφOU illustrated at reference numeral 90. The other input to this multiplexer is a saturation number (designated SAT) to set the output of this multiplexer to the maximum magnitude which can be represented if an overflow has occurred during an arithmetic operation. The output of this multiplexer is coupled back to the storage registers forming a part of the processor or to the memory modules 21 (FIG. 1) through the input data switch 23 as is required by the execution of the instructions. A control signal coupled to the enable terminal 94 of this multiplexer selects the input signal to be used and determines whether the selected data is to be coupled to the storage registers or to the memory modules. Addresses for the memory modules are supplied by the memory address generator FIG. 4.

The output of adder ZERO, 64 the output of multiplier zero, 60, form two data inputs to multiplexer MPXA4B. An enable signal is coupled to the data select terminal 95 of this multiplexer determines which of these signals will be coupled to the output.

Multiplexer MPXA4A illustrated at reference numeral 97 receives data input from the adder two output, reference numeral 66, and the upper bits of registers *b* and *d*. The output of this multiplexer along with the output of multiplexer MPXA4B illustrated at reference numeral 87, forms data inputs to adder four illustrated at reference numeral 67. The data output signal of adder FOUR, the output signal of adder THREE illustrated at reference numeral 68 and a saturation signal forms the data input signals to multiplexer MPXφ1U. An enable signal coupled to enable input terminal 98 selects which of these signals will be coupled to the output of this multiplexer. The output signal of multiplexer MPXφ1U 97 is returned to the arithmetic registers of the arithmetic unit 11 or to the memory modules 21 through the input data switch 23 as required by the instruction being executed.

Multiplier 2 illustrated at reference numeral 62 receives as data input signals the upper bits of register *a* and the lower bits of register *b* through multiplexer MPXM2 illustrated at reference numeral 98. The output of multiplier TWO 62, forms one input to adder ONE, 65, with the other input to this adder being the output signal of multiplexer MPXA1 illustrated at the reference numeral 99.

Multiplexer MPXA1 illustrated at reference numeral 99 receives as data input signs the lower bits of registers *b*, *c*, and *d* and the output signal of multiplier THREE illustrated at the reference numeral 63. One input to multiplier THREE is the lower bits of register *a* and the other input is either the upper bits of the *b* register or the lower bits of register *c* as determined by the enable signal coupled to the enable terminal 105 of multiplexer MPXM3. The other input to multiplier THREE is the lower bits of the register *a*.

The output of multiplier THREE 63, and the lower bits of registers *b*, *c* and *d* forms the input signals to multiplexer MPXA1. An enable signal coupled to the enable input terminal 81 determines which input signal will be coupled to the output of this multiplexer. The output signal of this multiplexer and the output signal of multiplier TWO 62 form the two input signals to adder ONE, illustrated at reference numeral 65.

The output signal of adder ONE forms one of the input signals to multiplexer MPXA3B illustrated at reference numeral 106. The other inputs to this multiplexer are the lower bits of data registers *b*, *c*, and *d* with the signal coupled to the output of this multiplexer being determined by an enable signal coupled to enable terminal 107 of this multiplexer. The output signal of this multiplexer forms one of the inputs to adder three 68. The other data inputs to adder THREE is the data output signal of multiplexer MPXA3A illustrated at reference numeral 108. The data input signals to this multiplexer are the output signal of adder FIVE illustrated at reference numeral 69 and the lower bits of registers *b*, *c*, and *d*. The signal coupled to the output of this multiplexer is determined by an enable signal coupled to enable terminal 109 of this multiplexer.

The output signal of adder THREE is coupled to multiplexer MPXφOL illustrated at the reference numeral 110. The other input to this multiplexer is a saturation signal to indicate that an addition has been performed which results in an overflow. The signal coupled to the output of this multiplexer is determined by an enable signal coupled to enable terminal 115 of this multiplexer.

Multiplexer MPXA5A illustrated at reference numeral 116 receives as input signals the output of multiplier three and the output of adder one respectively illustrated at reference numerals 63 and 65. The output of this multiplexer is coupled to one input of adder five illustrated at reference numeral 69. A select signal coupled to terminal 111 selects which of the inputs will be coupled to the output. The other data input to adder five is the output signal of multiplexer MPXA5B, illustrated at reference numeral 117. The inputs to this multiplexer are the output signal of adder three 68, and the lower bits of registers *b* and *d*. Which of these input signals is coupled to the output terminal of this multiplexer and in turn to the input of adder five is determined by a select signal coupled to terminal 118 of this multiplexer. The output of adder five along with a saturation signal is coupled to the data input terminals of multiplexer MPX$\phi$1L illustrated at reference numeral 119. Which of these signals is coupled to the output of this multiplexer is determined by the enable signal coupled to enable terminal 120 of this multiplexer. The output signal of this multiplexer is in turn returned to the data registers or to the memory modules 21 by way of the data input switch 23 as is required by the execution of the instruction. The operation of this multiplexer is controlled by a gate signal coupled to terminal 120 of this multiplexer.

Figure 6:
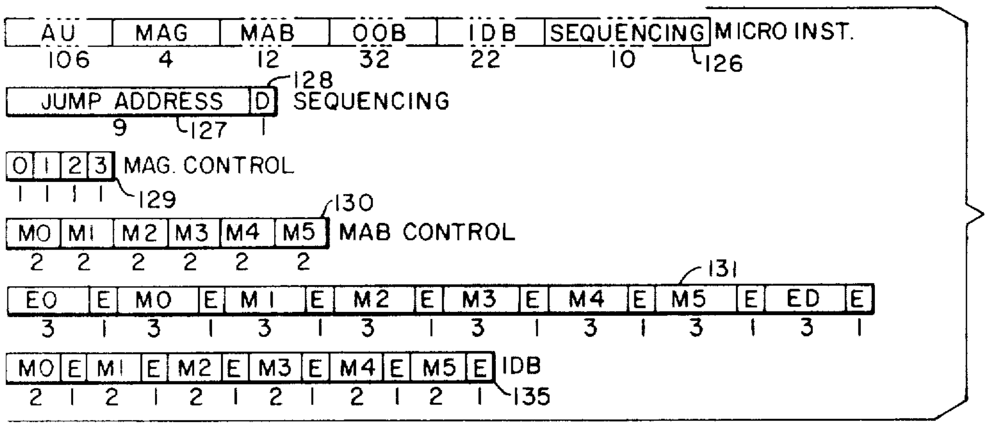
FIG. 6 is a diagram illustrating the micro instruction word used by the processor.

As previously discussed, the digital processor is controlled by a micro program which permits the instructions executed by the processor to be changed during the time when the processor is being constructed without substantially altering the basic design of the processor. To accomplish this result, micro program instruction words are stored in the micro program memory 15 (FIG. 1) and these words are read by the control logic 14 to produce the signals necessary for controlling the arithmetic and memory units. A micro program structure which is found to be very useful is indicated in FIG. 6. The basic micro program instruction word comprises a 186 bit digital data word illustrated at reference numeral 126. The basic micro instruction word is further divided into sections with each section being assigned an individual function. For example, 10 bits of the micro instruction word have been designated as sequencing bits and are illustrated in FIG. 6 at reference numeral 127. Nine of the bits assigned to sequencing specifies the address in the micro program memory 15 from which the next micro instruction word 126 will be read. This permits the program words stored in this memory to be read in any order as required by the program being executed. The address portion 127 of the micro instruction word also includes a deferred read bit illustrated at reference numeral 128. This bit permits the subsequent micro instruction program to be read before the current instruction is fully executed if portions of the two instructions can be simultaneously executed by the processor without conflict. For example, if the current instruction is performing an arithmetic operation utilizing one of the memory modules 21 and the subsequent instruction is an output instruction utilizing a different memory module 21 the two instructions can be overlapped without conflict. In this case, the deferred memory bit 128 would be set to a logic 1 and permit the subsequent instruction to be read while the current arithmetic instruction is being executed. The usefulness of this feature obviously depends to some extent on the detailed design of the arithmetic and memory units. One feature which permits this feature to be extensively used is making the memory modules 21 (FIG. 1) independent memories so that the above described arithmetic, input and output functions can be simultaneously executed.

Four bits of the micro instruction are assigned to control of the memory address generator. These are illustrated at reference numeral 129 of FIG. 6. In the illustrated example four bits of the micro program instruction word have been assigned to this function. These bits are used to control the counter select logic 56 illustrated in FIG. 4 to determine which of the counters C1 through C5 is to be coupled to the memory address buses 42 through 45 to generate addresses. In the illustrated example, only two choices are provided for each of the memory address buses 42 through 45 therefore, one bit of this word can be assigned to each memory address bus 42 through 45 with logic level of this signal indicating which of the address counters will be used.

Twelve bits of the micro instruction are assigned to memory address bus control. These words are illustrated at reference numeral 130. The memory address bus control word illustrated at reference numeral 130 determines which of the memory address buses 42 through 45 will be coupled to the individual memory modules 21 illustrated in FIG. 3. In FIG. 3, each of the memory modules 21 have been labeled MO through M5 in sequential order to indicate that these are independent memory modules. The memory address bus control word illustrated at reference numeral 130 in FIG. 5 is also divided into six two bit portions and labeled MO through M5. These designations indicate which portion of this word will select a memory address bus for a particular memory module. For example, the two bits of the memory address control word 130 which are labeled MO selects which of the memory address buses 42 through 45 of FIG. 4 will be coupled to memory module MO of FIG. 3 for the execution of a particular instruction. Similarly, the portions of the word labeled M1 through M5 will select the memory address bus to be used with corresponding memory modules M1 through M5.

Another 32 bits of the micro instruction word is assigned to control the output data switch 24, FIG. 3, such that the selected memory module 21 or external data input is coupled to the selected data bus. This portion of the word is illustrated at reference numeral 131, also FIG. 6.

Referring now to FIG. 3, it can be seen that the output data switch 24 has six output buses. Four of these go to the arithmetic unit and couple to registers *a*, *b*, *c*, and *d*. These registers were previously discussed with respect to the functional block diagram of the arithmetic unit. The input to the output data switch 24 comes from the memory modules 21 and from an external data input bus. The output data control word 131 has been divided into four bit segments with each one of these segments assigned to one of these inputs. For example, the segment labeled MO is assigned to the input from memory module MO of FIG. 3. Each segment of this output data bus control word contains four bits. Three of the bits are decoded to determine to which of the output buses the associated input is to be coupled and the other bit, labeled E, is an enable bit which enables the unit to which the output is to be coupled so that the data can be written into this unit.

The portions of the output data bus control word 131 labeled M1 through M5 are assigned to memory modules M1 through M5 perform identically with the MO portion as discussed above with respect to memory module MO. Similarly, the portion of the output data bus control word labeled ED corresponds to the external data input bus and performs similarly to the portions assigned to the memory module 21.

From the above discussion it is clear that the bits of the output data bus control word of the micro instruction word 126 can be selected such that any particular data input to the output data switch 24 can be coupled to any of the output data buses of this switch as required by the execution of the particular instruction.

Another 22 bit portion of the micro instruction word is assigned to control the input data switch 23 in a manner similar to that discussed above with respect to the output data switch 24. This portion of the word is illustrated at reference numeral 135.

In FIG. 6 the input data bus control portion of the micro instruction word is divided into six three bit portions and labeled MO through M5 with these designations corresponding to memory modules MO through M5 of FIG. 3. Each portion of this word is assigned three bits, one being an enable bit which enables the selected memory module to be written into and the other two bits being decoded to select which of the four data inputs to the input data switch 23 is coupled to the selected memory module 21. This portion of the micro instruction word is illustrated at reference numeral 135, FIG. 6.

Figure 7:
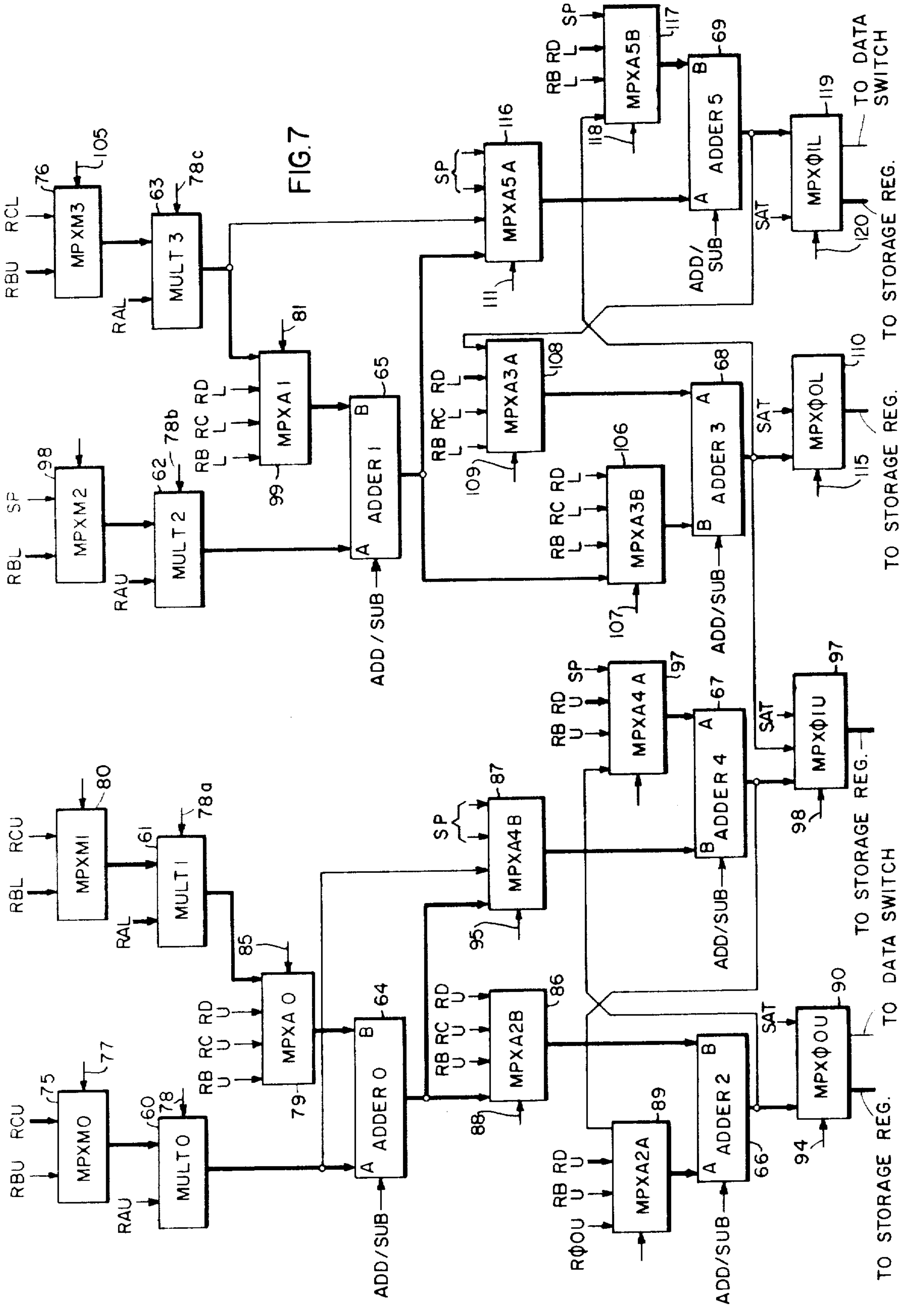
FIG. 7 is a flow chart illustrating how data flows through the arithmetic unit during the execution or a fast fourier transform instruction.

FIG. 7 is a block diagram of the arithmetic section with the data paths used during the execution of the Fast Fourier Transform instruction shown in heavy dark lines. Each path through the arithmetic performs all the calculations necessary for one iteration of the Fast Fourier Transforms calculation. That is, it performs all the calculations to solve the following equation:

$$X_{0R} = X_{0R} + X_{16R}\text{Cos }\omega - X_{16I}\text{ Sin }\omega$$
$$X_{0I} = X_{0I} + X_{16L}\text{Cos }\omega + X_{16R}\text{Sin }\omega$$
$$X_{16R} = X_{0R} - X_{16R}\text{Cos }\omega + X_{16I}\text{Sin }\omega)$$
$$X_{16I} = X_{0I} - X_{16I}\text{Cos }\omega - X_{16R}\text{Sin }\omega)$$

In FIG. 7 the registers $a$, $b$, $c$ and $d$ are loaded from a memory module as follows:

$X_{16I}$ is loaded into register RBU $X_{16R}$ is loaded into register RBL $X_{0I}$ is loaded into register RDL Sin $\omega$ is loaded into register RAW $C$ or $\omega$ is loaded into register RAL The addresses to load the registers are as follows:

A. Counter C1 generates addresses to load register $b$.

B. Counter C2 generates addresses to load register $a$.

C. Counter C3 generates addresses to store the results of the computation.

Each pass through the arithmetic unit performs all of the above discussed calculations. The results of the calculations are available as follows:

A. $X_{0R}$ is available at the output of multiplexer MPXφOU 90.

B. $X_{16R}$ is available at the output or multiplexer MPXφIU 98.

C. $X_{16I}$ is available at the output or multiplexer MPXφOL 110.

D. $X_{0I}$ is available at the output of multiplexer MPXφ1C 119.

The Fast Fourier Transform is defined as follows:

The FFT instruction performs a base 2 Fast Fourier Transform for the selected number of data points as defined by the contents of the block size register. The elementary operation is the "complex butterfly" as $^{i\theta}$ $\pm b$ where $a$, $e^{i\theta}$ and $b$ are complex. For an N point FFT, there are $\log_2 N$ stages to the FFT. In each stage, the butterfly operation is performed N/2 times. Thus, a total of N/2 $\log_2 N$ operations are performed for the full FFT. The FFT is microprogrammed at a series of 12 microprogram commands one for each stage for a 4,096-point transform. Smaller FFT's are executed by entering at the appropriate point further down in the microprogram. Field NSTAGE of the FFT instruction controls how many stages are executed which allows a partial FFT to be performed. The FFT scale register contains 12 bits, one for each stage. A logic 1 results in a shift right of 1 bit of all complex samples for the associated stage, a 0 results in no shift.

At each stage, the input and output memories roles are reversed internally at the microprogram memory. Thus, for an even number of stages, the transform appears in the memory used for input. For an odd number of stages, the transform appears in the memory labelled output.

Coefficients are stored in the constant memory. The coefficients must be stored as a complex number $c = e^{i\theta_1} = \cos\theta + i\sin\theta$. They are stored in ascending order between $\theta = 0$ and $\theta = \pi/2$. The number of coefficients which must be stored is N/4 where N is the block size of the largest FFT in the program. The same coefficients may be used for any FFT of lesser size.

The macro program for the Fast Fourier Transformer is as follows:

| Order Type | Block Size | Constant Memory | Data In-1 | Data In-2 | Data Out-1 | Data Out-2 | Not Used |
|---|---|---|---|---|---|---|---|
| | | Memory Tags | | | | | |
| 1 | 2 | 3 | 4 | 5 | 6 | 7 | 8 |

Fields

| Constants | Input | Output | Not Used | Not Used | Number of Spaces |
|---|---|---|---|---|---|
| Data Bus Offset | | | | Increment Tags | |
| 9 | 10 | 11 | 12 | 13-15 | 16 |

Fields

FIELDS

The macro instruction word is divided into sixteen fields performing the following functions:

| Field | Number of bits | Function | Usage |
|---|---|---|---|
| 1 | 8 | Order Type | FFT |
| 2 | 4 | Block Size | N Register Tag |
| 3 | 3 | | constants |
| 4 | 3 | Specifies | Data In (First half) |
| 5 | 3 | Memories | Data In (second half) |
| 6 | 3 | Used | Data Out (first half) |
| 7 | 3 | | Data Out (second half) |
| 8 | 3 | | — |
| 9 | 4 | | Constants |
| 10 | 4 | Offset | Input |
| 11 | 4 | Register | Output |
| 12 | 4 | (φ) | — |
| 13 | 4 | Increment | — |
| 14 | 4 | Tags | — |
| 15 | 4 | | — |
| 16 | 4 | NSTAGE | Number of stages of FFT |

Figure 8:
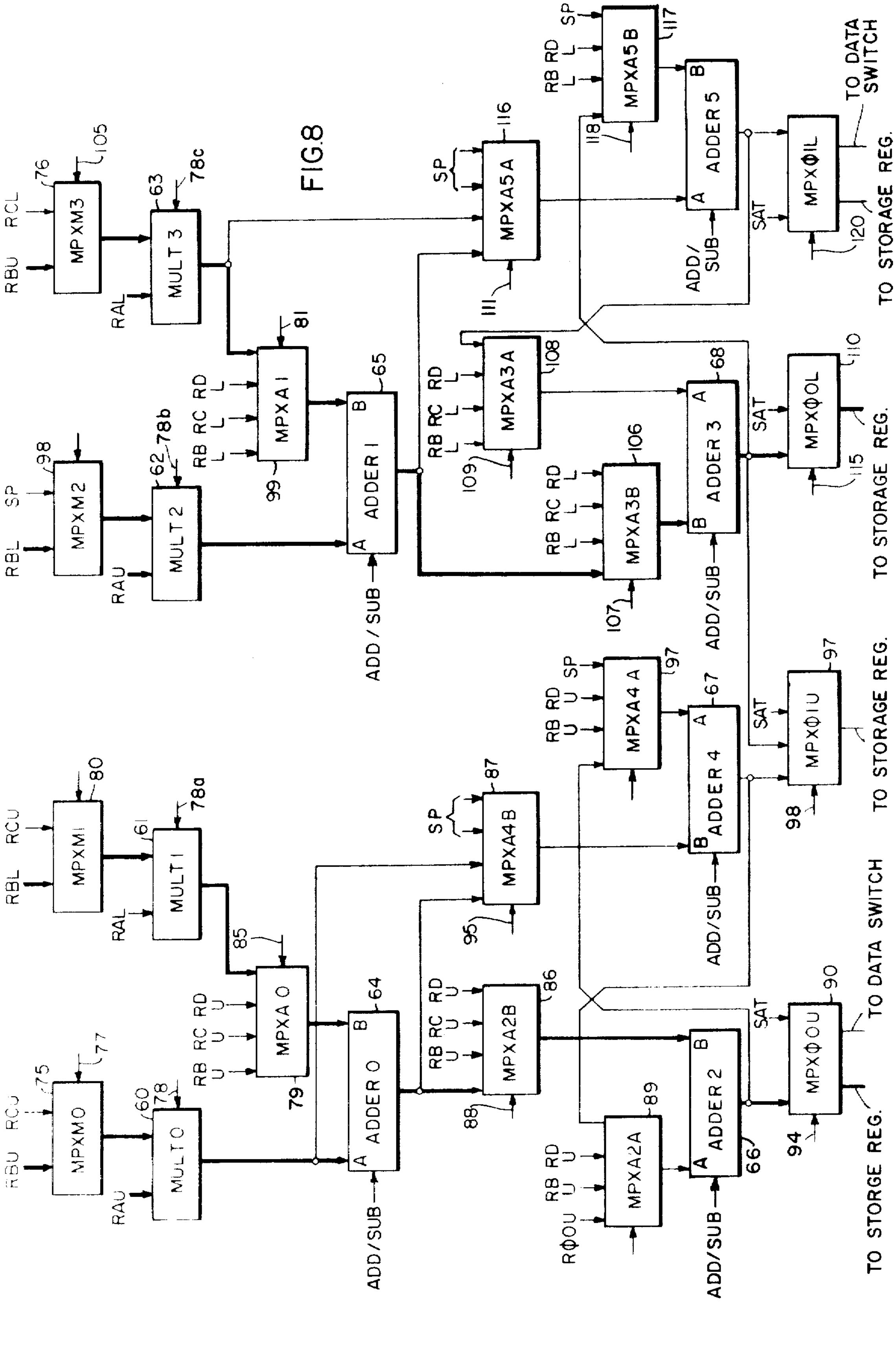
FIG. 8 is a flow chart illustrating how data flows through the arithmetic structure during the execution of a complex multiply instruction.

FIG. 8 is another drawing of the arithmetic section of the processor with the paths through the arithmetic unit utilized to perform the complex multiply shown in heavy black lines.

The complex multiply command is defined as follows:

Two N-point complex vectors, $X_i$, $Y_i$ ($i = 1, \ldots, N$) are multiplied together element by element to produce a resulting vector $Z_i = (X_i)(Y_i)$ ($i = 1, N$). The operation is used to spectrum shift complex data stream.

The complex multiply macro instruction field format is with the format for the Fast Fourier Transform previously illustrated.

The utilization of the fields 1–16 of this instruction are as follows:

| Field | Number of bits | Function | Usage |
|---|---|---|---|
| 1 | 8 | Order Type | CMPY |
| 2 | 4 | Block Size | Block Size Memory Address |
| 3 | 3 | | Constant |
| 4 | 3 | Specifies | Input |
| 5 | 3 | Memories | Output |
| 6 | 3 | Used For | — |
| 7 | 3 | | — |
| 8 | 3 | | — |
| 9 | 4 | | Constant |
| 10 | 4 | Offset | Input |
| 11 | 4 | Register | Output |
| 12 | 4 | (φ) | — |
| 13 | 4 | | Constant |
| 14 | 4 | Increment | Input |
| 15 | 4 | Register | Output |
| 16 | 4 | For | — |

Figure 9:
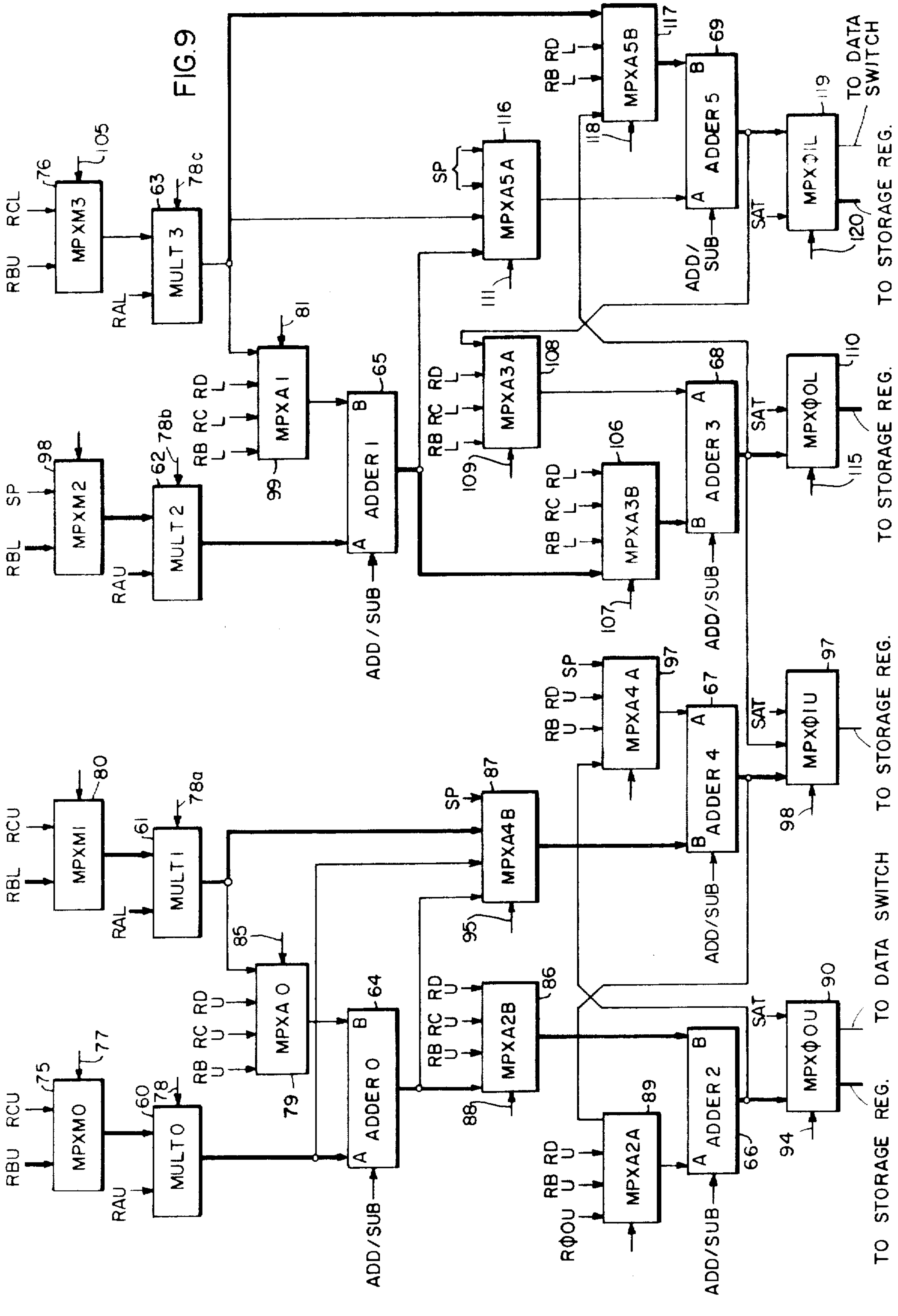
FIG. 9 is a diagram illustrating how data flows through the arithmetic processor during the execution of a real multiply instruction.

FIG. 9 is a diagram of the arithmetic unit with the data paths used to perform a real by complex multiply command performs a real multiply in accordance with the following definition of the real multiply:

This instruction is designed to provide time domain weighting, gain control, and right shifting for scaling. Its inputs are two independent complex vectors ($X_j = a_j + b_j i$ and $Y_j = c_j + d_j i$ ($i = 1, N$), and a complex vector $C_j = r_{1j} + r_{2j} i$ composed of two independent real vectors, one in the real part, the other in the imaginary part. The output is two independent complex vectors $U_j$ and $V_j$, where $U_j = r_1 a_j + r_1 b_j i$ and $V_j = r_2 c_j + r_2 d_j i$. Thus, two separate complex vectors are weighted independently. Ordinarily X is the first half of the FFT block and Y is the second half with $r_1$ the first half of the real weighting function and $r_2$ the second half.

The format of the macro instruction is identical with the format of the complex multiply instruction previously discussed. The use of the fields of the instruction word are shown below.

| Field | Number of bits | Function | Usage |
|---|---|---|---|
| 1 | 8 | Order Type | RMPY |
| 2 | 4 | Block Size | Block Size Memory Address |
| 3 | 3 | | Constant |
| 4 | 3 | Specifier | Input 1 |
| 5 | 3 | Memories | Input 2 |
| 6 | 3 | Used For | Output 1 |
| 7 | 3 | | Output 2 |
| 8 | 3 | | — |
| 9 | 4 | | Constant |
| 10 | 4 | Offset | Input |
| 11 | 4 | Register | Output |
| 12 | 4 | (φ) | — |
| 13 | 4 | | Constant |
| 14 | 4 | Increment | Input |
| 15 | 4 | Register | Output |
| 16 | 4 | (I) | — |

Figure 10:
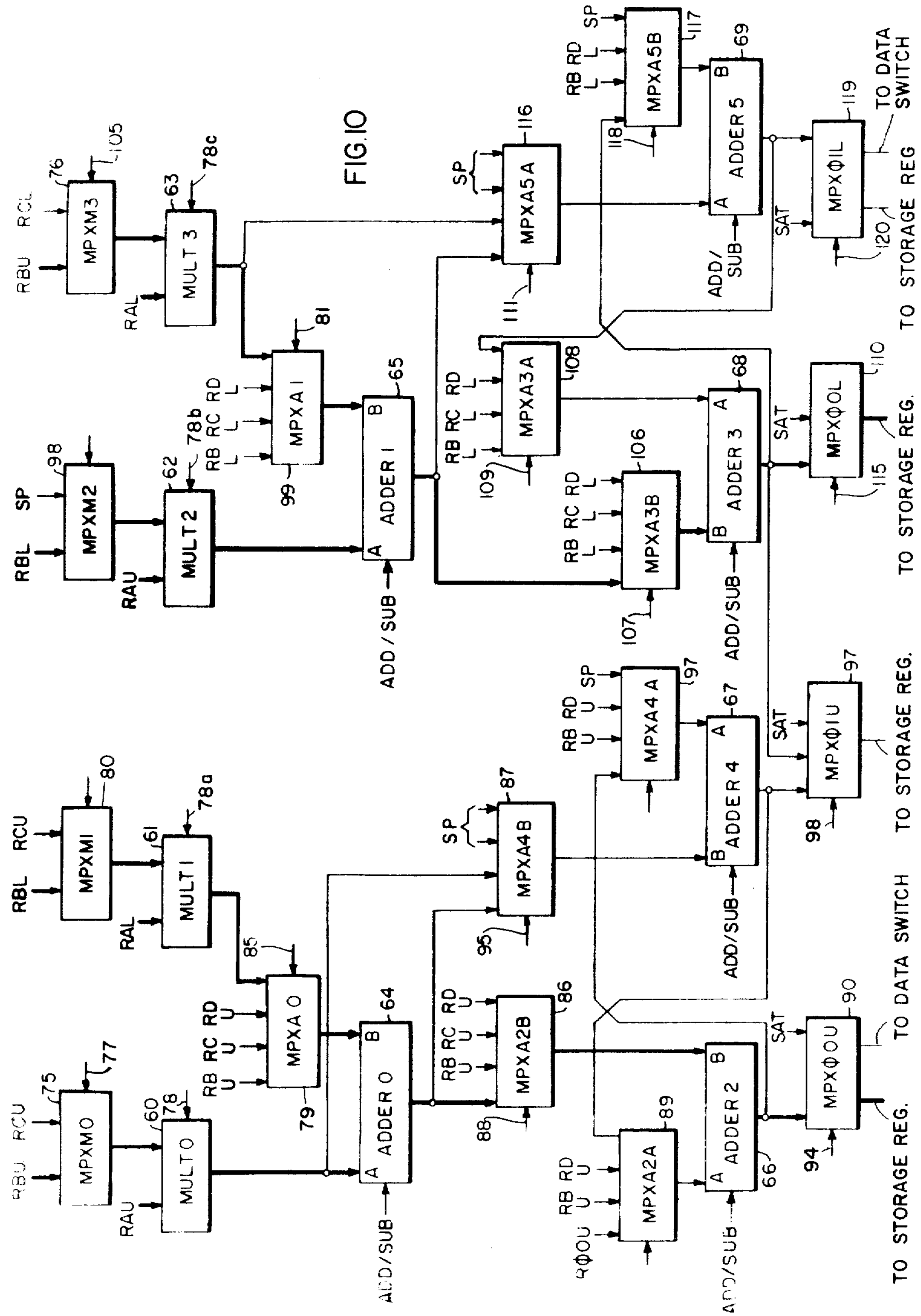
FIG. 10 is a block diagram illustrating how data flows through the arithmetic section during the execution of a detect instruction.

FIG. 10 is a diagram of the arithmetic unit with the data paths utilized in the execution of a detect command shown in heavy black lines. The detect command finds the maximum amplitude of a given function in accordance with the following definition:

a. Definition

The instructions provides a basic linear detect operation accurate to 3 percent rms or about 0.25 dB. The algorithm is $S = \text{MAX}(|I|, |Q|) + 3/8\ \text{MIN}(|I|, |Q|)$ The format of the macro instruction is identical with the format previously discussed with reference to the Fast Fourier Transforms instruction. The use of the fields of the instruction is indicated below.

| Field | Number of bits | Function | Usage |
|---|---|---|---|
| 1 | 8 | Order Type | Detect |
| 2 | 4 | Block Size | Block Size Memory Address |
| 3 | 3 | | Input |
| 4 | 3 | Specifies | Output |
| 5 | 3 | Memories | — |
| 6 | 3 | Used For | — |
| 7 | 3 | | — |
| 8 | 3 | | — |
| 9 | 4 | | Input |
| 10 | 4 | Offset | Output |
| 11 | 4 | Register | — |
| 12 | 4 | (φ) | — |
| 13 | 4 | | Input |
| 14 | 4 | Increment | Output |
| 15 | 4 | Register | — |
| 16 | 4 | (I) | — |

Figure 11:
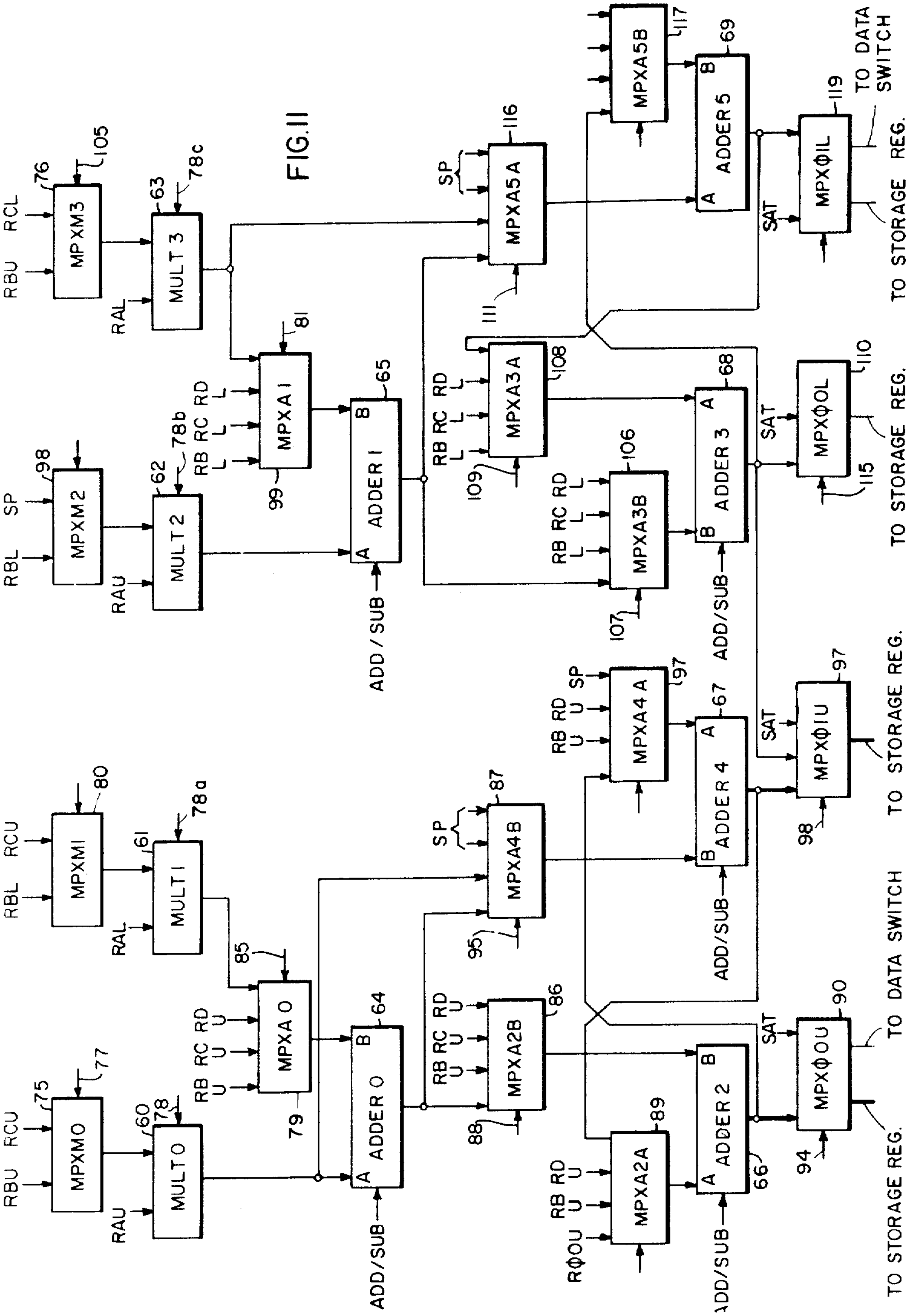
FIG. 11 is a flow chart illustrating how data flows through the arithmetic section during the execution of a clear memory instruction.

FIG. 11 is a reproduction of the arithmetic section with the data paths used and the execution of a clear memory command shown in heavy black lines.

The definition of the clear memory command is as follows:

This instruction places zeros into the specified memory locations. The instruction is designed to enable a memory to be cleared or set to zero.

The format of the macro instruction word is identical with the format previously illustrated with respect to the Fast Fourier Transform.

The various fields of the macro instruction perform the following functions.

| Field | Number of bits | Function | Usage |
|---|---|---|---|
| 1 | 8 | Order Type | Clear to Zeros |
| 2 | 4 | Block Size | Block Size Memory Address |
| 3 | 3 | | Output 1 |
| 4 | 3 | | Output 2 |
| 5 | 3 | Specifies | Output 3 |
| 6 | 3 | Memories | Output 4 |
| 7 | 3 | Used For | Output 5 |
| 8 | 3 | | Output 6 |
| 9 | 4 | | Output 1, 2, 3 |
| 10 | 4 | Offset | Output 4, 5, 6 |
| 11 | 4 | Register | — |
| 12 | 4 | (φ) | — |
| 13 | 4 | | Output 1, 2, 3 |
| 14 | 4 | Increment | Output 4, 5, 6 |
| 15 | 4 | Register | Permit |
| 16 | 4 | (I) | 6 Bit Used |

Figure 12:
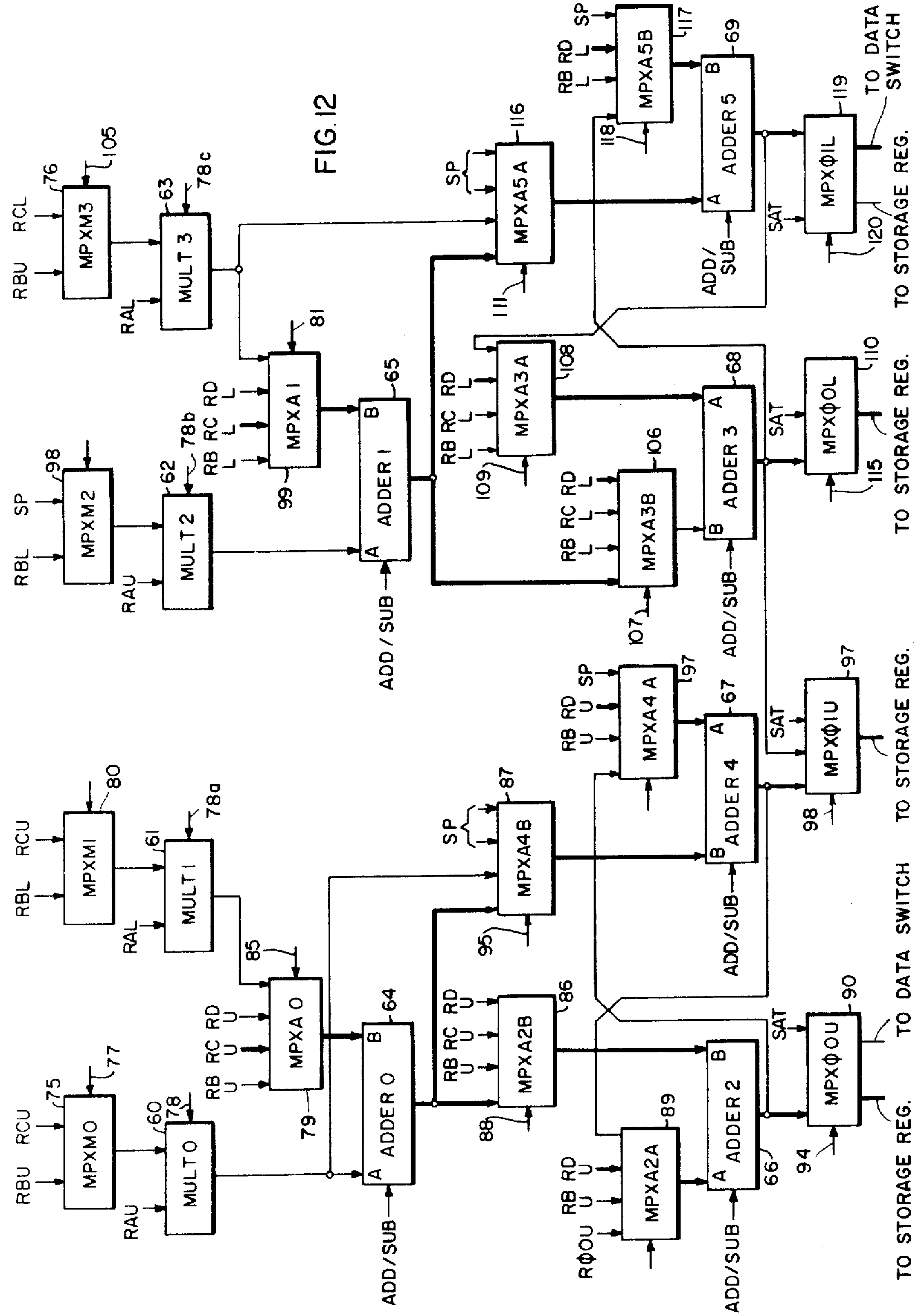
FIG. 12 is a flow chart illustrating how data flows through the arithmetic section during the execution or a separate instruction.

FIG. 12 is a diagram of the arithmetic unit with the data command used in the execution of a separate instruction shown in details. This instruction is designed to allow an FFT of block size N to be used to process 2N real data samples, or for two independent N real samples.

A real set of 2N samples may be transformed by the standard FFT of length N by loading alternative pairs of $X_n$ into complex words $C_n$ according to $$C_n = X_{2n} + JX_{2n+1} \text{ for } n = 0, 1, 2 \ldots, N-1$$

The post transform operation consists of two operations:

1. Form $A_M$ and $B_M$ where $$A_M = ½ (C_M + C^*_{N-M})$$

$$B_M = ½ (C_M - C^*_{N-M})$$

for $M = 0, 1, 2 \ldots, N-1$ where $C_j = C_{j+N}$ and where $C_M$ is the transform of $C_n$. This operation is performed by the Separate Command.

2. Form the final post transform which generates the complex transform of the 2N points $x$ where $$X_M = ½\, A_M + 1/2\, j B_M e^{-j2\ M/2N}$$

The coefficients in the second operation are stored as a cosine/sine table from $\theta = 0$ to $\theta = \pi/2$ in ascending order. This operation is performed using stage 1 of an N point FFT.

Two independent real data sets $a$ and $b$ may be transformer in one N point FFT by loading the two sets into the real and imaginary parts of the complex word. The resulting spectra are $A_M$ and $B_M$ generated using the separate command as described above:

The format of the macro instruction is identical with the format previously discussed with reference to the Fast Fourier Transform instruction. The functions of the fields are defined as follows:

| Field | Number of bits | Function | Usage |
|---|---|---|---|
| 1 | 8 | Order Type | Separate |
| 2 | 4 | Block Size | Block Size Memory Address |
| 3 | 3 | Specifies Memories Used For | Input |
| 4 | 3 | | Input |
| 5 | 3 | | Output |
| 6 | 3 | | Output |
| 7 | 3 | | — |
| 8 | 3 | | — |
| 9 | 4 | Offset Register (φ) | Input |
| 10 | 4 | | Output |
| 11 | 4 | | — |
| 12 | 4 | | — |
| 13 | 4 | Increment Register (I) | Input |
| 14 | 4 | | Output |
| 15 | 4 | | — |
| 16 | 4 | | — |

Figure 13:
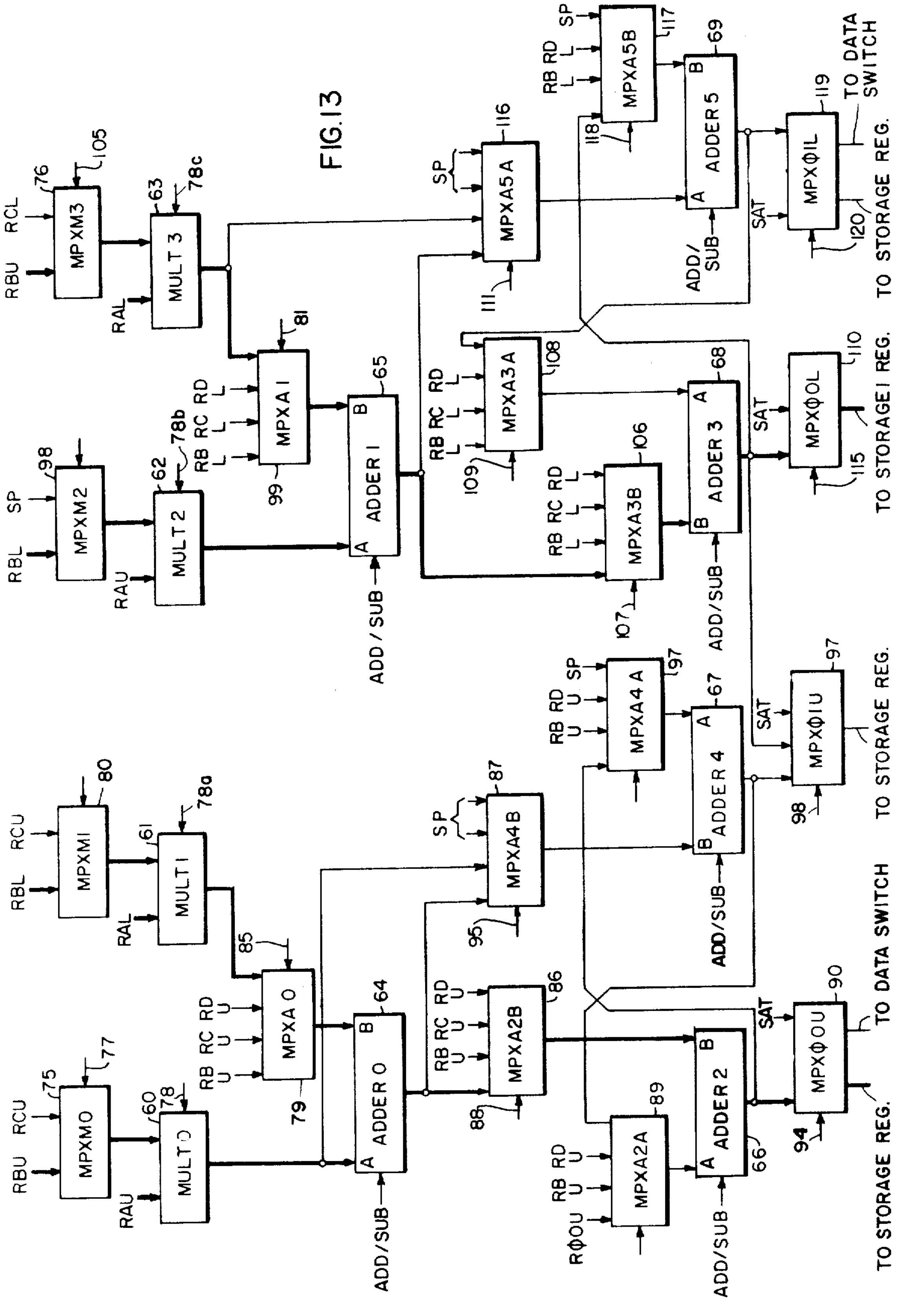
FIG. 13 is a diagram illustrating how data flows through the arithmetic section during the execution of a conjugation command.

FIG. 13 is a diagram of the arithmetic unit with the paths used in the execution of a conjunction command shown in heavy dark lines.

This instruction generates the complex conjugate of 2 complex vectors $x_j = a_j + b_j i$ and $y_j = c_j + d_j i (j = 1,N)$ where $x_j{}^* = a_j - b_j i$ and $y_j{}^* = c_j - d_j i$.

The format of the macro instruction word is identical with the format previously discussed with reference to the Fast Fourier Transform in this instruction word perform the following functions.

| Field | Number of bits | Function | Usage |
|---|---|---|---|
| 1 | 8 | Order Type | Conjugation |
| 2 | 4 | Block Size | Block Size Memory Address |
| 3 | 3 | Specifies Memories Used For | Input 1 |
| 4 | 3 | | Input 2 |
| 5 | 3 | | Output 1 |
| 6 | 3 | | Output 2 |
| 7 | 3 | | — |
| 8 | 3 | | — |
| 9 | 4 | Offset Register (φ) | Input |
| 10 | 4 | | Output |
| 11 | 4 | | — |
| 12 | 4 | | — |
| 13 | 4 | Increment Register (I) | Input |
| 14 | 4 | | Output |
| 15 | 4 | | — |
| 16 | 4 | | — |

Figure 14:
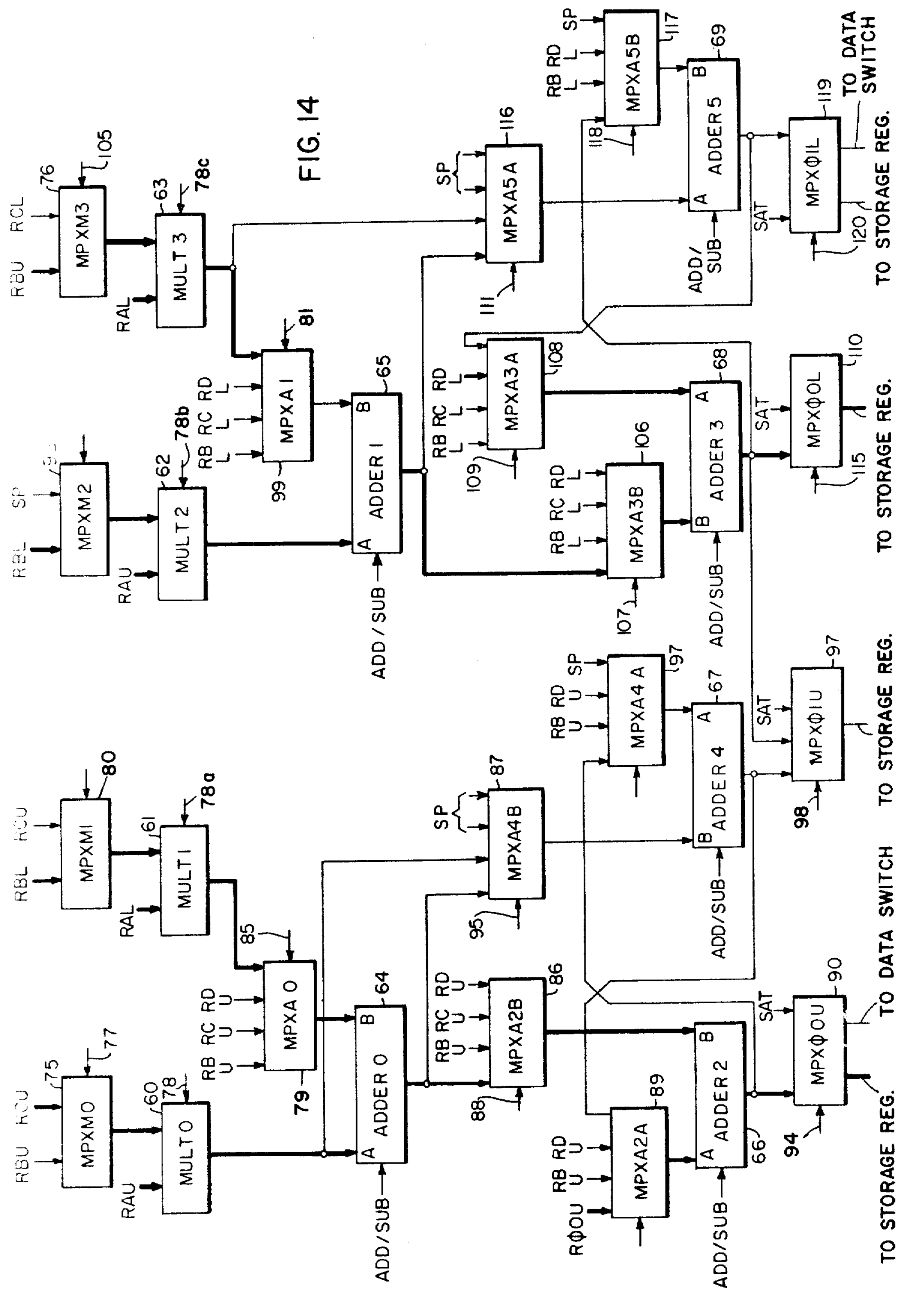
FIG. 14 is a block diagram illustrating how data flows through the arithmetic section during the execution of a multiply instruction.

FIG. 14, is a diagram of the arithmetic section with the data paths used in the execution of a complex multiply and accumulate instruction shown in heavy black lines.

This instruction is designed to perform an integrate and dump or transversal filter. The input is two complex vectors $X_i$, $Y_i (i = 1,N)$ which are multiplied and summed to give $Z = \Sigma(X_i).(Y_i)$. The result is a single complex quantity, Z. Either of the vectors, $X_i$ and $Y_i$, can serve as the input or reference (or constant) vector. That is, the processor does not distinguish between constant and input vectors.

The format of this instruction is identical to the format of the Fast Fourier Transform previously discussed. In this instruction, the various fields perform the following function.

b. Fields Used

| Field | Number of bits | Function | Usage |
|---|---|---|---|
| 1 | 8 | Instruction Type | Complex Multiply & Accumulate |
| 2 | 4 | Block Size | Block Size Memory Address |
| 3 | 3 | Use of Memories | Constant |
| 4 | 3 | | Input |
| 5 | 3 | | Output |
| 6 | 3 | | — |
| 7 | 3 | | — |
| 8 | 3 | | — |
| 9 | 4 | Offset Register (φ) | Constant |
| 10 | 4 | | Input |
| 11 | 4 | | Output |

The above discussed instructions are only examples of complex data processing commands which may be implemented using the disclosed processor. In each of the above instructions, and any additional instructions which may be implemented, the "instruction type" portion of the macro instruction is decoded to enable the various multiplexers of the arithmetic unit as required. The previously discussed data paths for various instructions indicate which data paths must be energized for these instructions. Implementation of additional instructions might require that additional data paths through the arithmetic unit be defined. The basic structure of the processor permits this to be conveniently done. The address counters and memory address busses used for the instructions, other than the Fast Fourier Transform, are not discussed in detail because that is largely a programmer's choice. This choice is made easy by the flexibility of the memory address generator illustrated by its use in the Fast Fourier Transform.

Figure 15:
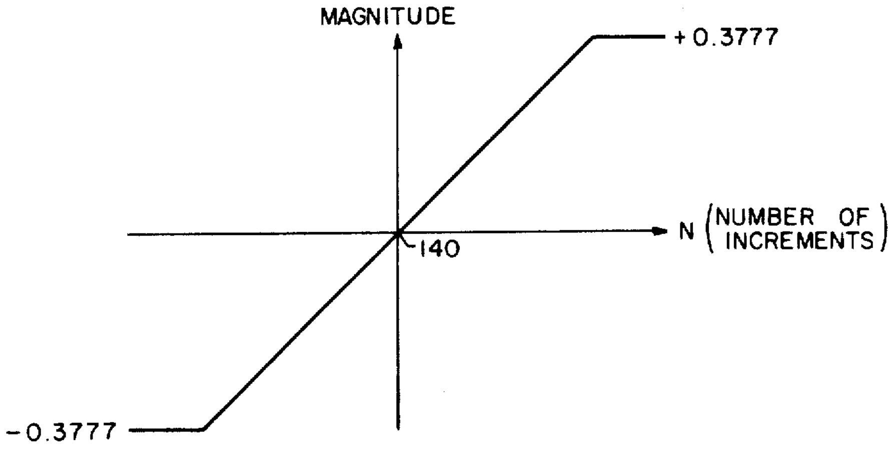
FIG. 15 is a diagram illustrating the self-saturating number system used by the processor.
Figure 16:
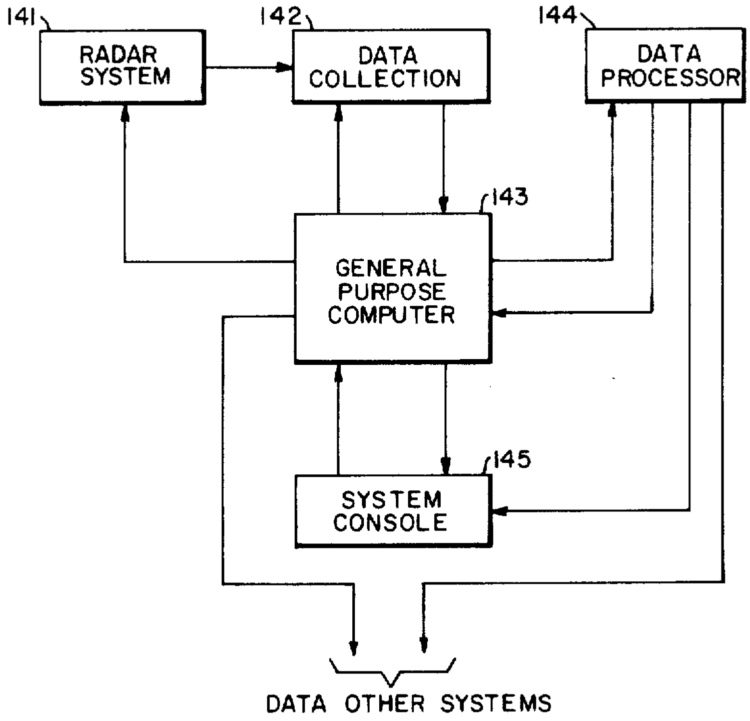
FIG. 16 is a block diagram of a radar system utilized in the disclosed data processor.

FIG. 15 is a diagram illustrating the saturable number systems used in the disclosed data processor. Beginning with a magnitude of zero, illustrated at reference numeral 140 and starting incrementing by plus one, resulting number increases until it reaches an amplitude of +.3777 with additional increments after this point not changing the maximum value. This is defined in this way so that overflows in the arithmetic section will result in the highest positive number which can be represented rather than introducing a large error and a sign change as is common with cnventional 2's complement arithmetic. Correspondingly, beginning with the zero as indicated at reference numeral 140 and decreasing the magnitude by −1 increments the value decreases until it reaches a point of −0.3777 and thereafter remains constant. This is to be contrasted with the conventional approach used in most processors which permits an overflow to be generated and the magnitude to either return to zero or to the most positive value of which can be represented by the computer.

In the above discussion the numbers use a base 8. Either a greater or lesser number of digits may be used without altering the basic concept.

The above number system is particularly advantageous in a digital processor where statistical computations are being performed in that an overflow as the result of an addition introduces a smaller error and can be more easily ignored as not significantly effecting the accuracy of the calculated results.

FIG. 18 illustrates one application of the above-discussed digital processor. In this system, data is coupled from a radar system 141 to a data collection system 142. The data collection 142 is controlled by a general purpose digital computer 143 which in turn sends control signals to the radar system 141 and to the data processor 144. Additionally, the digital computer may send data to other related systems and to a system console 145. The system console provides a method for the operator to communicate with the general purpose computer 143 and other components of the system as well as supplying the necessary displays to properly coordinate the operation of the system.

In a typical system the radar system 141 may be a pulse doppler radar system with the video output of this system being digitized by the data collection system 141 to generate a series of digital data words representative of these video signals. These signals and macro programs are then transferred to the data processor 144 by the general purpose computer 143. The data processor 141 processes these signals. Typical examples of data processing being a Fast Fourier Transform to improve the accuracy of the range data and transferred to the system console 145. It is well known that such a processing greatly increases the target detection accuracy of the radar system 141. The disclosed data processor 144 is particularly advantageous in this application because it provides a higher data processing capability than was available in typical prior art systems thereby permitting additional processing which significantly increasing the overall performance of the system.

What is claimed is:

1. A programmable digital processor comprising:

a. an arithmetic unit for processing at least two digital data signals including logic to detect any overflow which result from an arithmetic operation on said data signals, said logic including means for setting the magnitude of the output signal of the arithmetic unit to its maximum value when an overflow occurs;

b. memory means for storing digital program words specifying the sequence of operation to be performed by said arithmetic unit; and c. control means for reading and decoding said program words and for generating in response thereto control signals to control said arithmetic unit.

2. A programmable digital processor in accordance with claim 1 wherein said memory means includes a plurality of independently accessible memory elements in which said digital program words and data signals to be processed by said arithmetic unit may be stored.

3. A programmable digital processor in accordance with claim 2 further including a plurality of address counters which can be used to selectively address said memory elements.

4. A programmable digital processor in accordance with claim 3 further including micro program means for selectively coupling said address counters to said memory elements.

5. A programmable digital processor in accordance with claim 3 wherein said at least one of said address counters is adapted to generate address sequences in reverse bit order.

6. A programmable digital processor in accordance with claim 5 further including means coupled to said address counters for determining the address sequence.

7. A programmable digital processor in accordance with claim 1 wherein said data signals are digital representation of complex numbers, said arithmetic unit processing the real and complex components of said data signals independently.

8. A programmable digital processor in accordance with claim 7 wherein an overflow generated by processing the real component of said data signals causes the associated real component of the output of said arithmetic unit to be set to a value equal to the maximum magnitude which can be represented and wherein the imaginary components or the output signal of said arithmetic unit are not effected by said overflow.

9. A programmable digital processor in accordance with claim 7 wherein an overflow generated by processing the imaginary component of said data data signals causes the associated imaginary component of the output or said arithmetic unit to be set to a value equal to the maximum magnitude which can be represented and wherein the real components or the output signal or said arithmetic unit are not effected by said overflow.

10. A programmable processor in accordance with claim 1 further including a counter coupled to said arithmetic unit such that said counter is incremented each time an arithmetic operation generates an overflow.

11. A programmable digital processor in accordance with claim 1 wherein said digital program words are macro program words.

* * * * *